US008055278B2

(12) United States Patent
Skärby et al.

(10) Patent No.: US 8,055,278 B2
(45) Date of Patent: Nov. 8, 2011

(54) SYSTEMS AND METHODS FOR TRACKING POWER PEAKS OF A SIGNAL

(75) Inventors: Ulf Skärby, Lidingo (SE); Erling Floser, Danderyd (SE); Fredrik Huss, Sundbyberg (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 396 days.

(21) Appl. No.: 12/274,808

(22) Filed: Nov. 20, 2008

(65) Prior Publication Data

US 2010/0124936 A1 May 20, 2010

(51) Int. Cl.
*H04Q 7/20* (2006.01)

(52) U.S. Cl. .................. 455/456.5; 455/424; 375/130; 370/328

(58) Field of Classification Search ................ 455/456.5
See application file for complete search history.

(56) References Cited

U.S. PATENT DOCUMENTS

| | | | |
|---|---|---|---|
| 6,006,096 A | 12/1999 | Trompower | |
| 6,370,397 B1* | 4/2002 | Popovic et al. | 455/561 |
| 6,421,369 B1* | 7/2002 | Iwaskai et al. | 375/130 |
| 6,775,252 B1* | 8/2004 | Bayley | 370/328 |
| 6,915,123 B1 | 7/2005 | Daudelin | |
| 7,058,399 B2* | 6/2006 | Klein et al. | 455/424 |
| 7,116,988 B2* | 10/2006 | Dietrich et al. | 455/456.1 |
| 2004/0043774 A1 | 3/2004 | Lee | |
| 2004/0132443 A1* | 7/2004 | Klein et al. | 455/424 |

OTHER PUBLICATIONS

Yeung, K.L. et al., "A comparative study on location tracking strategies in cellular mobile radio systems", Global Telecommunications Conference, 1995, Conference Record, Communication Theory Mini-Conference, Globecom '95, IEEE Singapore 13-17, Nov. 1995, New York, NY, USA, IEEE, US, vol. 1, Nov. 13, 1995, pp. 22-28, XP010607522.
International Search Report, issued on Sep. 14, 2009, in International Application No. PCT/SE2008/051435, 4 pages.
International Preliminary Report on Patentability issued in PCT application No. PCT/SE2008/051435 on May 24, 2011,7 pages.
International Preliminary Report on Patentability issued in PCT application No. PCT/SE2009/051310 on May 24, 2011,7 pages.

\* cited by examiner

*Primary Examiner* — Charles Shedrick
(74) *Attorney, Agent, or Firm* — Rothwell, Figg, Ernst & Manbeck, P.C.

(57) ABSTRACT

In one aspect, the invention provides a method for tracking a mobile terminal. In some embodiments, this method includes the following steps: receiving a signal transmitted from the mobile terminal; searching a primary search area for a signal associated with the mobile terminal; searching a secondary search area for a signal associated with the mobile terminal, wherein the secondary search area is larger than the primary search area; determining the strength of a signal associated with the mobile terminal that was found by searching the secondary search area; and determining whether the primary search area should be modified based on the determined strength of the signal that was found by searching the secondary search area.

23 Claims, 4 Drawing Sheets

SYSTEMS AND METHODS FOR TRACKING POWER PEAKS OF A SIGNAL

TECHNICAL FIELD

The present invention relates to radio access networks, and, more particularly, to systems and methods for tracking power peaks of a signal.

BACKGROUND

In order to maintain air interface synchronization between a terminal (e.g., a mobile phone) and a base station, as well as to demodulate a radio signal transmitted by the terminal, the base station typically uses a tracking mechanism to follow the paths of a signal transmitted by the terminal. The tracking mechanism typically tracks the terminal within a defined search area (a.k.a., window).

When handing off a terminal connection from one base to another base station, the base station to which the connection is being handed off typically searches for signal paths associated with the terminal over the entire range of the base station. After the base station finds a signal path, the base station tracks the terminal by searching a much smaller search area than was used to initially locate the terminal.

In some radio access networks, a "reflected" signal could be stronger than a direct signal. For example, a signal transmitted from a repeater or relay or a signal bouncing off of a mountain or other structure may be stronger than the original signal transmitted by the terminal. Typically, there is a large timing difference between the direct signal and the reflected signal.

Using the repeater case as an example, a terminal moving away from the base station towards the repeater is tracked by the base station to maintain air interface synchronisation. At some point, from the base station's perspective, the strength of the signal received from the repeater will be larger than the strength of the signal received directly from the terminal. The timing difference is usually large between the direct signal being tracked and the "reflected" signal (i.e., the signal transmitted by the repeater). If the timing difference is larger than can be handled by the tracking mechanism and its window size, the base station tracking mechanism will not be able to include the stronger signal from the radio repeater. The strong signal from the radio repeater will instead contribute to the received noise, and reduce the signal to noise ratio.

What is desired are systems and methods for overcoming this problem.

SUMMARY

In one aspect, the invention provides a method for tracking a mobile terminal. In some embodiments, this method includes the following steps: receiving a signal transmitted from the mobile terminal; searching a primary search area for a signal associated with the mobile terminal; searching a secondary search area for a signal associated with the mobile terminal, wherein the secondary search area is larger than the primary search area; determining the strength of a signal associated with the mobile terminal that was found by searching the secondary search area; determining whether the primary search area should be modified based on the determined strength of the signal that was found by searching the secondary search area; and modifying the primary search area in response to a determination that the strength of the signal that was found by searching the secondary search area exceeds a threshold (e.g., exceeds the strength of a signal associated with the mobile terminal that was found by searching the primary search area or other threshold). Both the primary search area and the secondary search may be searched periodically (i.e., at regular or irregular time intervals) and, in some embodiments, the secondary search area is searched less frequently than the primary search area.

In some embodiments, the step of modifying the primary search area comprises altering the primary search area so that the primary search area includes the location where the signal associated with the mobile terminal was found in the secondary search area. In some embodiments, the primary search area is so altered without changing the size of the search area.

In some embodiments, the step of modifying the primary search area comprises increasing the size of the primary search area, wherein the size of the primary search area is increased so that the new primary search area includes the location where the signal associated with the mobile terminal was found in the secondary search area and the location where a signal associated with the mobile terminal was found in the old primary search area.

In some embodiments, the step of modifying the primary search area comprises creating a second primary search area, wherein the second primary search area is smaller in size than the secondary search area but includes the location where the signal associated with the mobile terminal was found in the secondary search area. In these embodiments, the method may further include the step of continuously searching, for some period of time, the first and second primary search areas for a signal associated with the mobile terminal.

In some embodiments, the method may further include the step of sending a timing alignment value to the mobile terminal in response to a determination that the strength of the signal that was found by searching the secondary search area exceeds a threshold, wherein the timing alignment value corresponds to a delay associated with that signal.

In another aspect, the present invention provides an improved base station. In some embodiments, the improved base station includes: a receiver for receiving signals transmitted from a terminal; a terminal tracking module configured to search a primary search area for a signal associated with the terminal; a secondary searching module configured to search a secondary search area for a signal associated with the terminal, wherein the secondary search area is larger than the primary search area; a signal strength determining module configured to determine the strength of a signal associated with the terminal that was found by searching the secondary search area; and a data processing module configured to determine whether the primary search area should be modified based on a determined strength of the signal that was found by searching the secondary search area.

In some embodiments, the terminal tracking module is further configured to modify the primary search area in response to receiving information indicating that the strength of the signal that was found by searching the secondary search area exceeds a threshold.

In some embodiments, the terminal tracking module is configured to modify the primary search in response to receiving said information by (1) altering the primary search area so that the primary search area includes the location where the signal associated with the terminal was found in the secondary search area without increasing the size of the search area, (2) increasing the size of the primary search area so that the new primary search area includes the location where the signal associated with the terminal was found in the secondary search area and the location where a signal associated with the terminal was found in the old primary search area, and/or (3) creating a second primary search area.

In some embodiments, the base station may also include a timing module configured to send a timing alignment value to the terminal in response to a determination that the strength of the signal that was found by searching the secondary search area exceeds a threshold, wherein the timing alignment value corresponds to a delay associated with that signal.

In some embodiments, the secondary searching module is configured to search the secondary search area less frequently than the tracking module is configured to search the primary search area.

The above and other aspects and embodiments are described below with reference to the accompanying drawings.

BRIEF DESCRIPTION OF THE DRAWINGS

The accompanying drawings, which are incorporated herein and form part of the specification, illustrate various embodiments of the present invention and, together with the description, further serve to explain the principles of the invention and to enable a person skilled in the pertinent art to make and use the invention. In the drawings, like reference numbers indicate identical or functionally similar elements.

DETAILED DESCRIPTION

Figure 1:
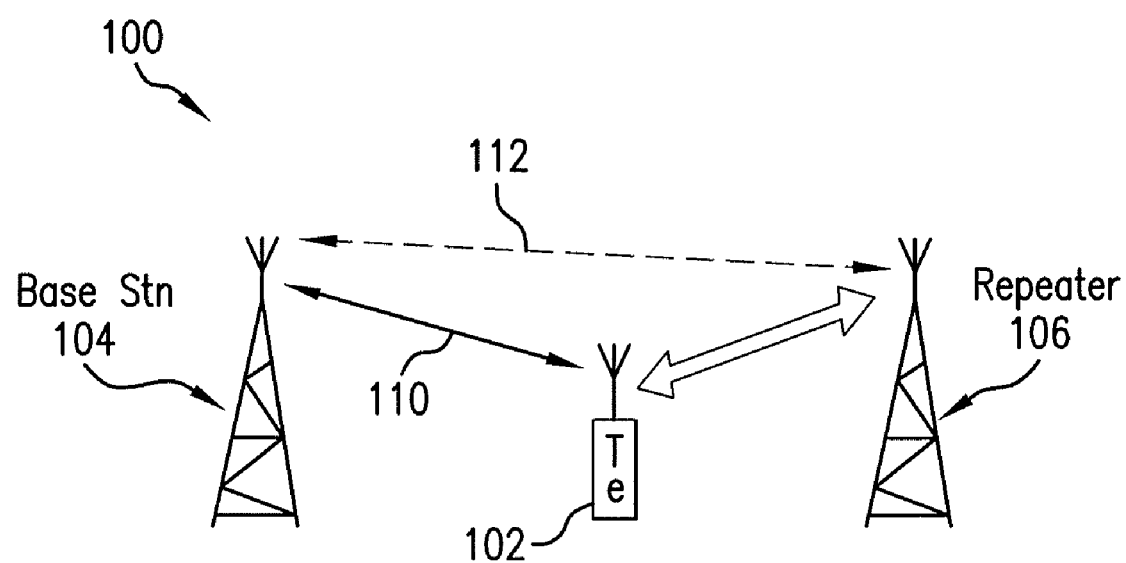
FIG. 1 illustrates a portion of a communication network according to some embodiments.

Referring now to FIG. 1, FIG. 1 illustrates a portion of a communications network 100 according to some embodiments of the invention. Network 100 includes a terminal (a.k.a., terminal equipment (TE)) in direct communication with a base station 104 and in indirect communication with the base station through a repeater 106 (or relay). As illustrated in FIG. 1, TE 102 transmits a signal 110. Signal 110 is received by base station 104 and repeater 106. Repeater 106 transmits a signal 112 corresponding to signal 110. Signal 112 is also received by base station 104.

As described in the background section, base station 104 includes a tracking mechanism to track TE 102. In some embodiments, base station 104 tracks TE 102 by searching a determined window for signal peaks associated with TE 102. As also described in the background section, "reflected" signal 112 could be stronger than direct signal 110. This could be the case, for example, when the repeater 106 is positioned between TE 102 and base station 104. If the timing difference between direct signal 110 being tracked and "reflected" signal 112 is larger than can be handled by the tracking mechanism and its window size, the base station will not be able to include signal 112 from the radio repeater. Signal 112 from repeater 106 will instead contribute to the noise received at base station 104, and, thereby, reduce the ratio of the level of signal 110 to the level of received noise.

Figure 2:
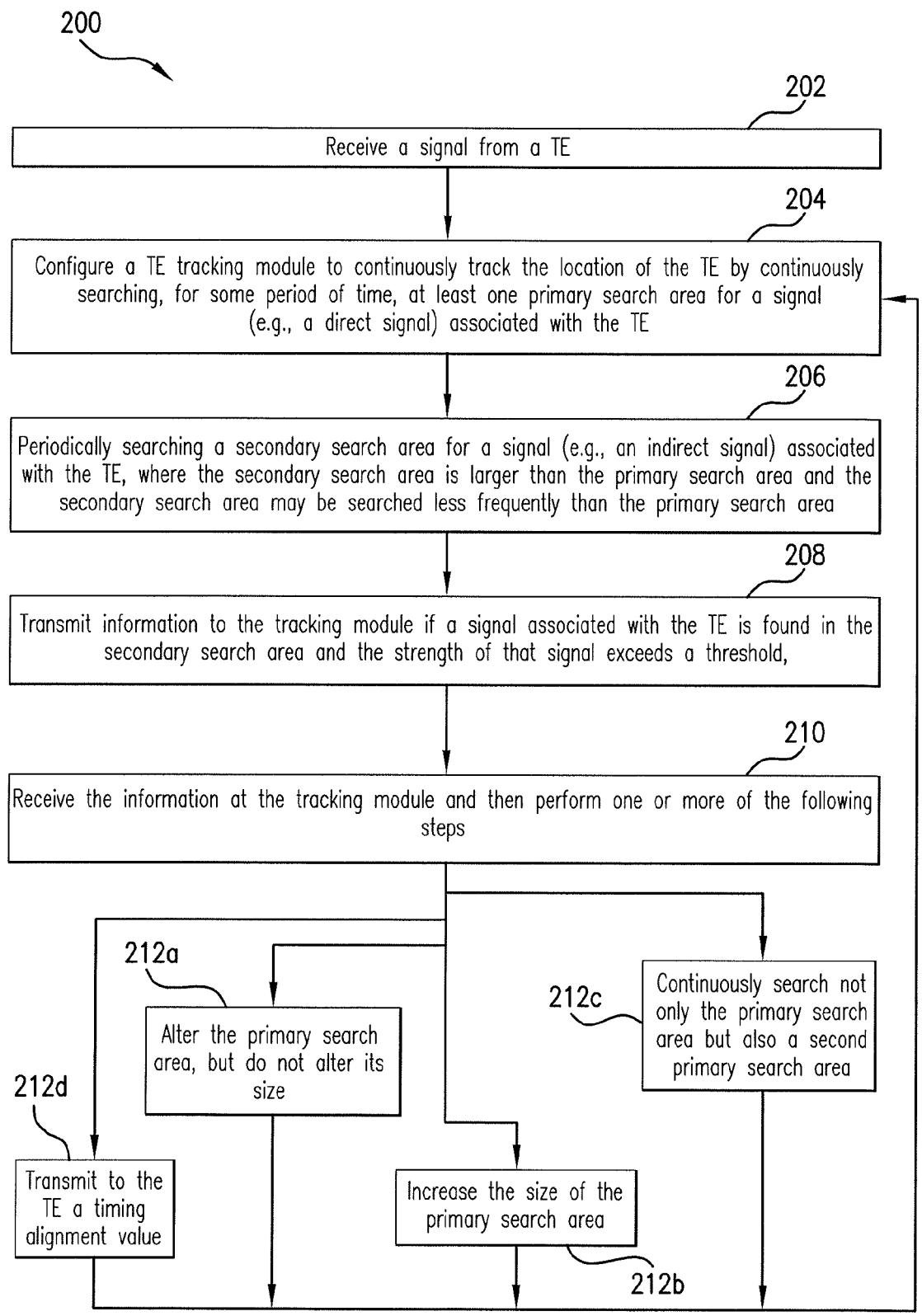
FIG. 2 is a flow chart illustrating a process according to some embodiments of the invention.

To overcome this problem, base station 104 can be configured to perform process 200 shown in FIG. 2. Process 200 may begin in step 202, where base station 104 receives a signal transmitted by TE 102. In step 204, a TE tracking module is configured to track the location of TE 102 by searching, for some period of time, at least one primary search area for a signal (e.g., a signal peak) associated with TE 102.

In step 206, base station 104 searches a secondary search area for a signal (e.g., an indirect signal) associated with TE 102, where the secondary search area is larger than the primary search area. In some embodiments, the secondary search area is searched less frequently than the primary search area. For example, the primary search area may be searched continuously, while the secondary search area may be searched once per second.

In step 208, if a signal associated with TE 102 is found as a result of searching the secondary search area, information pertaining to the signal is provided to the TE tracking module. In step 210, in response to receiving the information pertaining to the signal that was found as a result of searching the secondary search, the base station tracking module modifies the primary search area by, for example, performing one or more of steps 212a-212d.

In step 212a, the tracking module alters the primary search area so that the primary search area includes the location were the signal associated with TE 102 was found as a result of searching the secondary search area. In some embodiments, the act of altering the primary search area does not change the size of the primary search area. In some embodiments, the altering may be done with hysteresis.

In step 212b, the tracking module increases the size of the primary search area so that the new primary search area includes the location where the signal associated with TE 102 was found in the secondary search area and the location where the signal associated with TE 102 was found in the old primary search area.

In step 212c, the tracking module continuously searches not only the primary search area but also another search area (i.e., a second primary search area), where the second primary search area is smaller in size than the secondary search area but includes the location where the signal associated with TE 102 was found in the secondary search area.

In step 212d, base station 104 transmits to TE 102 a timing alignment value in response to determining that the strength of the signal that was found by searching the secondary search area exceeds a threshold, wherein the timing alignment value corresponds to a delay associated with that signal.

In the above manner, base station 104 will be able to use the "reflected" signal, and, thus, the reflected signal will not add to the noise level.

Figure 3:
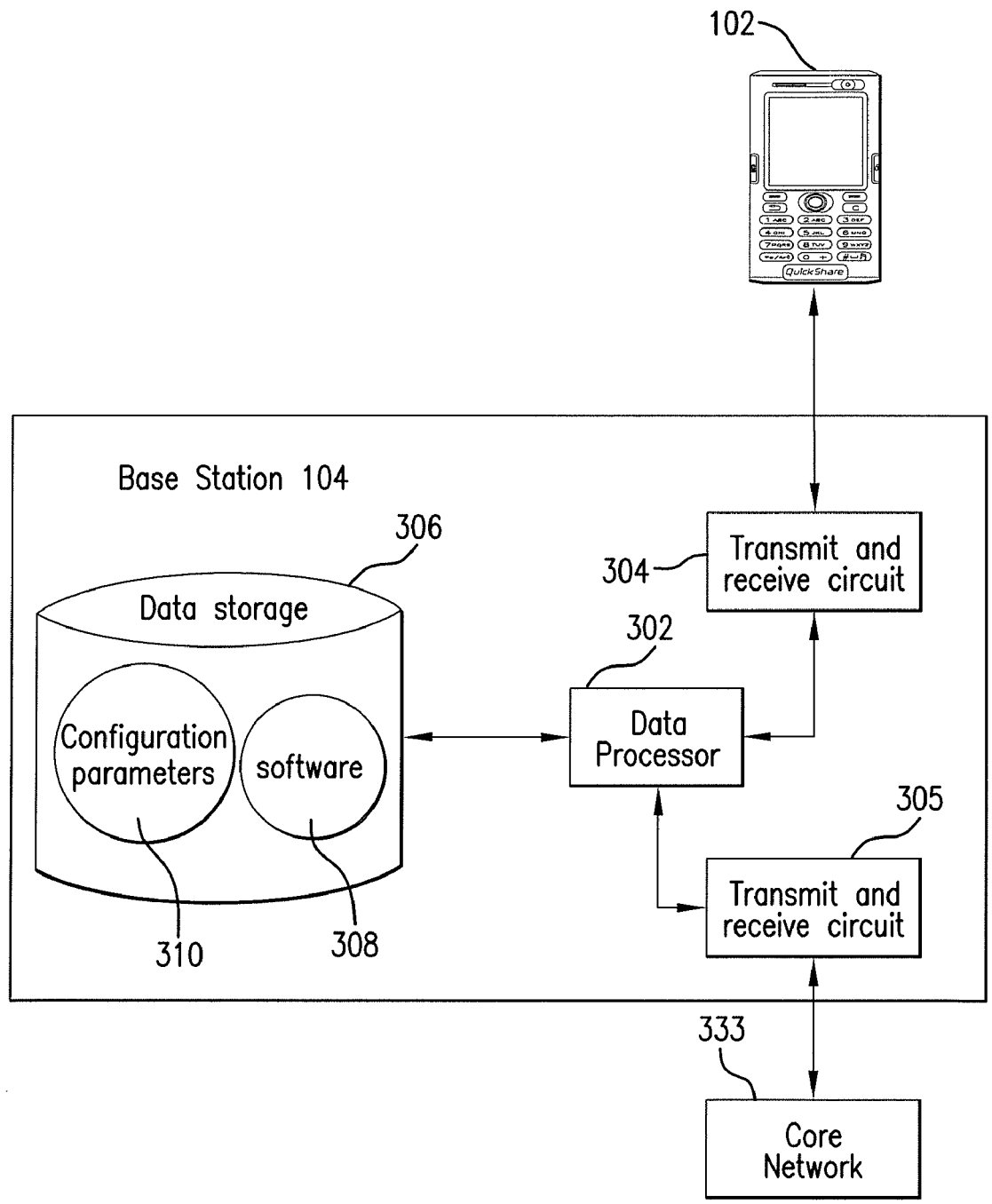
FIG. 3 is a functional block diagram of a base station according to some embodiments of the invention.

Referring now to FIG. 3, FIG. 3 is a functional block diagram of base station 104 according to some embodiments of the invention. As shown, base station 104 may comprise a data processing system 302 (e.g., one or more microprocessors), a data storage system 306 (e.g., one or more non-volatile storage devices) and computer software 308 stored on the storage system 306. Configuration parameters 310 may also be stored in storage system 306. Base station 104 also includes transmit/receive (Tx/Rx) circuitry 304 for transmitting data to and receiving data from TE 102 and transmit/receive (Tx/Rx) circuitry 305 for transmitting data to and receiving data from, for example, a core network 333.

Figure 4:
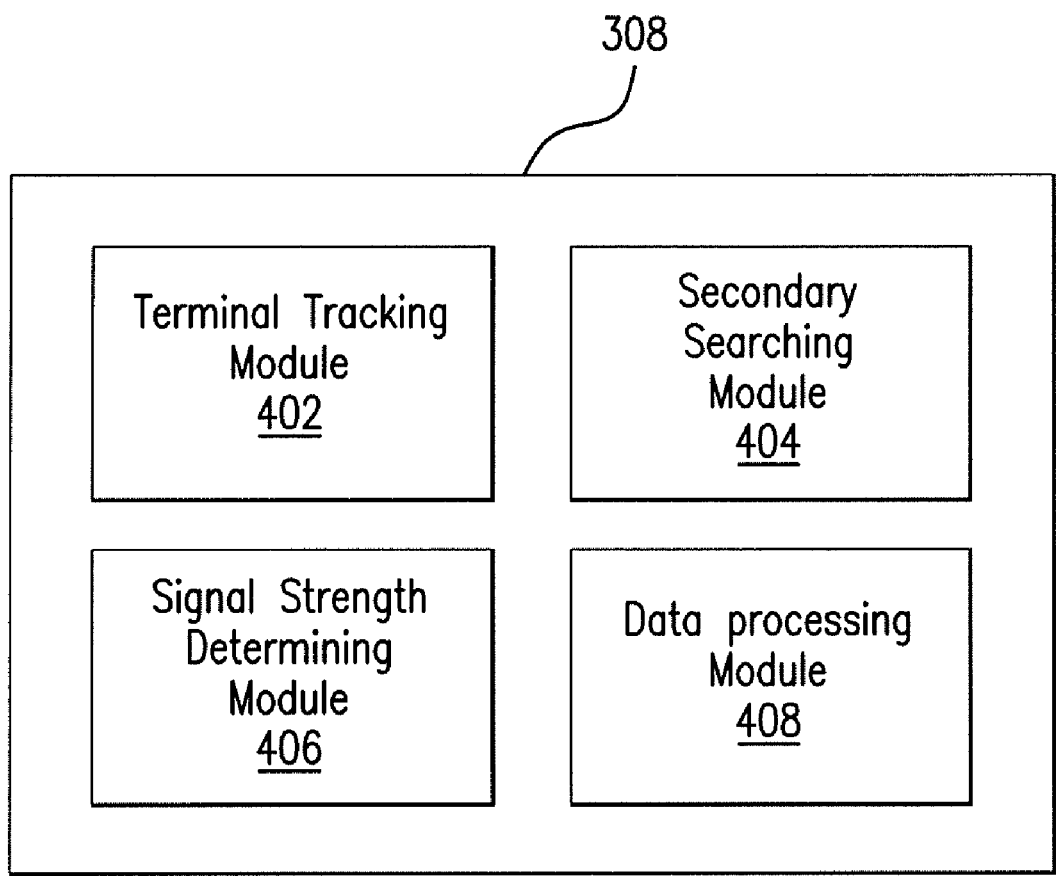
FIG. 4 is a functional block diagram of a base station tracking system according to some embodiments.

Software 308 is configured such that when processing system 302 executes software 308, base station 104 performs steps described above with reference to the flow chart shown in FIG. 2. For example, software 308 may include: (1) a terminal tracking module 402 (see FIG. 4) configured to search, for some period of time, a primary search area for a signal associated with the terminal; (2) a secondary searching module 404 configured to search a secondary search area for a signal associated with the terminal, wherein the secondary search area is larger than the primary search area; (3) a signal strength determining module 406 configured to determine the strength of a signal associated with the terminal that was found by searching the secondary search area; and (4) a data processing module 408 configured to determine whether the primary search area should be modified based on a determined strength of the signal that was found by searching the secondary search area.

While various embodiments of the present invention have been described above, it should be understood that they have been presented by way of example only, and not limitation. Thus, the breadth and scope of the present invention should not be limited by any of the above-described exemplary embodiments.

Additionally, while the processes described above and illustrated in the drawings are shown as a sequence of steps, this was done solely for the sake of illustration. Accordingly, it is contemplated that some steps may be added, some steps may be omitted, and the order of the steps may be re-arranged.

What is claimed is:

1. A method for tracking a mobile terminal, comprising:
   receiving, at a first point in time, a direct signal transmitted from the mobile terminal, wherein the first point in time falls within a primary signal tracking window;
   receiving, at a second point in time, a reflected signal corresponding to the direct signal, wherein the second point in time falls within a secondary signal tracking window and the reflected signal was transmitted by a repeater or relay in response to the repeater or relay receiving the direct signal;
   determining a strength of the reflected signal; and
   determining whether the primary signal tracking window should be modified based, at least in part, on the determined strength of the reflected signal.

2. The method of claim 1, further comprising modifying the primary signal tracking window in response to a determination that the strength of the reflected signal exceeds a threshold.

3. The method of claim 2, further comprising:
   determining a strength of the direct signal;
   comparing the strength of the direct signal to the strength of the reflected signal; and
   modifying the primary signal tracking window in response to a determination that the strength of the reflected signal exceeds the strength of the direct signal.

4. The method of claim 3, wherein the step of modifying the primary signal tracking window comprises altering the primary signal tracking window so that the primary signal tracking window overlaps with the secondary signal tracking window.

5. The method of claim 4, wherein the step of altering the primary signal tracking window does not change the size of the primary signal tracking window.

6. The method of claim 2, wherein the step of modifying the primary signal tracking window comprises increasing the size of the primary signal tracking window.

7. The method of claim 6, wherein the size of the primary signal tracking window is increased so that the new primary signal tracking window overlaps with the secondary signal tracking window.

8. The method of claim 2, wherein the step of modifying the primary signal tracking window comprises creating a second primary signal tracking window.

9. The method of claim 8, further comprising searching the first and second primary signal tracking windows for a signal associated with the mobile terminal, wherein the second primary signal tracking window is smaller in size than the secondary signal tracking window.

10. The method of claim 1, further comprising:
    sending a timing alignment value to the mobile terminal in response to a determination that the strength of the reflected signal exceeds a threshold.

11. The method of claim 1, wherein the secondary signal tracking window is used less frequently than the primary signal tracking window.

12. A base station, comprising:
    a receiver configured to receive signals transmitted from a mobile terminal;
    a processor configured to:
      at a first point in time, receive a direct signal, via the receiver, that was transmitted by the mobile terminal, wherein the first point in time falls within a primary signal tracking window;
      at a second point in time, receive a reflected signal, via the receiver, that corresponds to the direct signal, wherein the second point in time falls within a secondary signal tracking window and the reflected signal was transmitted by a repeater or relay in response to the repeater or relay receiving the direct signal;
      determine a strength of the reflected signal; and
      determine whether the primary signal tracking window should be modified based, at least in part, on the determined strength of the reflected signal.

13. The base station of claim 12, wherein the processor is further configured to modify the primary signal tracking window in response to a determination that the strength of the reflected signal exceeds a threshold.

14. The base station of claim 13, wherein the threshold is equal to a strength of the direct signal.

15. The base station of claim 13, wherein the processor is configured to modify the primary signal tracking window in response to said determination by altering the primary signal tracking window so that the primary signal tracking window overlaps with the secondary search area.

16. The base station of claim 15, wherein the processor is configured such that the altering of the primary signal tracking window does not change the size of the primary signal tracking window.

17. The base station of claim 13, wherein the processor is configured to modify the primary signal tracking window in response to said determination by increasing the size of the primary signal tracking window.

18. The base station of claim 17, wherein the processor is configured to increase the size of the primary signal tracking window so that the new primary signal tracking window overlaps with the secondary signal tracking window.

19. The base station of claim 13, wherein the processor is configured to modify the primary signal tracking window in response to said determination by creating a second primary signal tracking window.

20. The base station of claim 19, wherein the processor is configured to search the first and second primary signal tracking windows for a signal associated with the terminal, wherein the second primary signal tracking window is smaller in size than the secondary signal tracking window.

21. The base station of claim 12, wherein the processor is further configured to send a timing alignment value to the terminal in response to a determination that the strength of the reflected signal exceeds a threshold.

22. The base station of claim 12, wherein the processor is configured to use the secondary signal tracking window less frequently than the processor is configured to use the primary signal tracking window.

23. A base station, comprising:
a receiver for receiving signals transmitted from a terminal and reflected signals that have been transmitted by a relay or repeater and that correspond to signals transmitted from the terminal;
a terminal tracking module configured to search a primary search area for a signal associated with the terminal;
a secondary searching module configured to search a secondary search area for a reflected signal associated with the terminal, wherein the reflected signal was transmitted by a repeater or relay, wherein the secondary search area is larger than the primary search area;
a signal strength determining module configured to determine the strength of a reflected signal associated with the terminal that was found by searching the secondary search area;
a data processing module configured to determine whether the primary search area should be modified based on a determined strength of the reflected signal that was found by searching the secondary search area; and
a timing module configured to send a timing alignment value to the terminal in response to a determination that the strength of the reflected signal that was found by searching the secondary search area exceeds a threshold, wherein the timing alignment value corresponds to a delay associated with that reflected signal.

* * * * *